(12) United States Patent
Chen et al.

(10) Patent No.: US 11,012,107 B2
(45) Date of Patent: May 18, 2021

(54) ANTENNA SYSTEM (71) Applicant: HUAWEI TECHNOLOGIES CO., LTD., Shenzhen (CN)

(72) Inventors: Wei Chen, Shanghai (CN); Xiaolong Zhu, Shanghai (CN); Xiaojun Zheng, Shanghai (CN); Tao Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/455,741

(22) Filed: Jun. 27, 2019

(65) Prior Publication Data
US 2019/0319652 A1 Oct. 17, 2019

Related U.S. Application Data (63) Continuation of application No. PCT/CN2017/118536, filed on Dec. 26, 2017.

(30) Foreign Application Priority Data

Dec. 29, 2016 (CN) .......................... 201611247600.3

(51) Int. Cl.
*H04B 1/10* (2006.01)
*H01Q 1/24* (2006.01)
(Continued)

(52) U.S. Cl.
CPC ............... *H04B 1/109* (2013.01); *H01Q 1/24* (2013.01); *H01Q 1/246* (2013.01); *H01Q 1/36* (2013.01);
(Continued)

(58) Field of Classification Search
CPC ........ H04B 1/109; H04B 7/0413; H01Q 1/24; H01Q 1/36; H01Q 21/24; H01Q 23/00; H01Q 5/42; H01Q 1/521; H01Q 1/246
(Continued)

(56) References Cited

U.S. PATENT DOCUMENTS

| 5,581,268 A | 12/1996 | Hirshfield |
| 6,006,072 A | 12/1999 | Tsujimoto |

(Continued)

FOREIGN PATENT DOCUMENTS

| CN | 1142695 A | 2/1997 |
| CN | 1285964 A | 2/2001 |

(Continued)

OTHER PUBLICATIONS

Denis Rouffet. "Evolution of mobile systems". May 11, 2018, pp. 1-36.

*Primary Examiner* — Michael Y Mapa
(74) *Attorney, Agent, or Firm* — Kilpatrick Townsend & Stockton LLP (57) ABSTRACT

An antenna system, including a receiver set, a transmitter set, and an antenna array, where the receiver set includes a plurality of receivers, and the transmitter set includes a plurality of transmitters; the antenna array includes a first antenna unit set and a second antenna unit set; the first antenna unit set includes at least one first target antenna unit, and the second antenna unit set includes at least one second target antenna unit; and any one of the at least one first target antenna unit is connected to any receiver in the receiver set, and any one of the at least one second target antenna unit is connected to any transmitter in the transmitter set.

8 Claims, 9 Drawing Sheets

(51) Int. Cl.
*H01Q 1/36* (2006.01)
*H01Q 21/24* (2006.01)
*H01Q 23/00* (2006.01)
*H04B 7/0413* (2017.01)
*H01Q 5/42* (2015.01)
*H01Q 1/52* (2006.01)

(52) U.S. Cl.
CPC .............. *H01Q 1/521* (2013.01); *H01Q 5/42* (2015.01); *H01Q 21/24* (2013.01); *H01Q 23/00* (2013.01); *H04B 7/0413* (2013.01)

(58) Field of Classification Search
USPC ...................................................... 455/562.1
See application file for complete search history.

(56) References Cited

U.S. PATENT DOCUMENTS

| | | | |
|---|---|---|---|
| 6,094,178 A | | 7/2000 | Sanford |
| 6,304,214 B1* | 10/2001 | Aiken | ................ H01Q 3/2605 342/362 |
| 6,760,603 B1* | 7/2004 | Scherzer | ................ H01Q 1/246 343/725 |
| 2003/0073463 A1* | 4/2003 | Shapira | ................ H01Q 3/2676 455/562.1 |
| 2007/0155331 A1 | 7/2007 | Ylitalo | |
| 2011/0148730 A1 | 6/2011 | Gottl | |
| 2013/0059617 A1 | 3/2013 | Li | |
| 2013/0222201 A1 | 8/2013 | Ma et al. | |
| 2014/0159956 A1 | 6/2014 | Fourie | |
| 2016/0172757 A1 | 6/2016 | Gottl | |
| 2016/0178745 A1 | 6/2016 | Mohamadi | |
| 2017/0062927 A1 | 3/2017 | Ma et al. | |
| 2018/0108985 A1 | 4/2018 | Wang et al. | |

FOREIGN PATENT DOCUMENTS

| | | |
|---|---|---|
| CN | 1507675 A | 6/2004 |
| CN | 102916259 A | 2/2013 |
| CN | 103713376 A | 4/2014 |
| CN | 105471486 A | 4/2016 |
| CN | 106329151 A | 1/2017 |
| CN | 106848606 A | 6/2017 |
| JP | H03226690 A | 10/1991 |
| JP | 2000349545 A | 12/2000 |
| JP | 2001518265 A | 10/2001 |
| WO | 2015172292 A1 | 11/2015 |

* cited by examiner

ANTENNA SYSTEM

CROSS-REFERENCE TO RELATED APPLICATIONS

This application is a continuation application of International Application No. PCT/CN2017/118536, filed on Dec. 26, 2017, which claims priority to Chinese Patent Application 201611247600.3, filed on Dec. 29, 2016, The disclosures of the aforementioned applications are hereby incorporated by reference in their entireties.

TECHNICAL FIELD

The present invention relates to the field of communications technologies, and in particular, to an antenna system.

BACKGROUND

With development of a wireless communications technology, to increase a system capacity, a multiple-input multiple-output (Multiple Input Multiple Output, MIMO) technology is proposed, and a multi-column antenna is required. The MIMO technology can transmit a plurality of spatial flows through space division multiplexing to increase a capacity of a communications system, and the MIMO technology can improve reliability of the communications system through diversity. With an increase of a quantity of antennas, the MIMO technology increases a significant capacity, but also brings huge challenges to a performance indicator PIM, a consumable, a size, a weight, costs, and a yield rate in antenna design.

Figure 1:
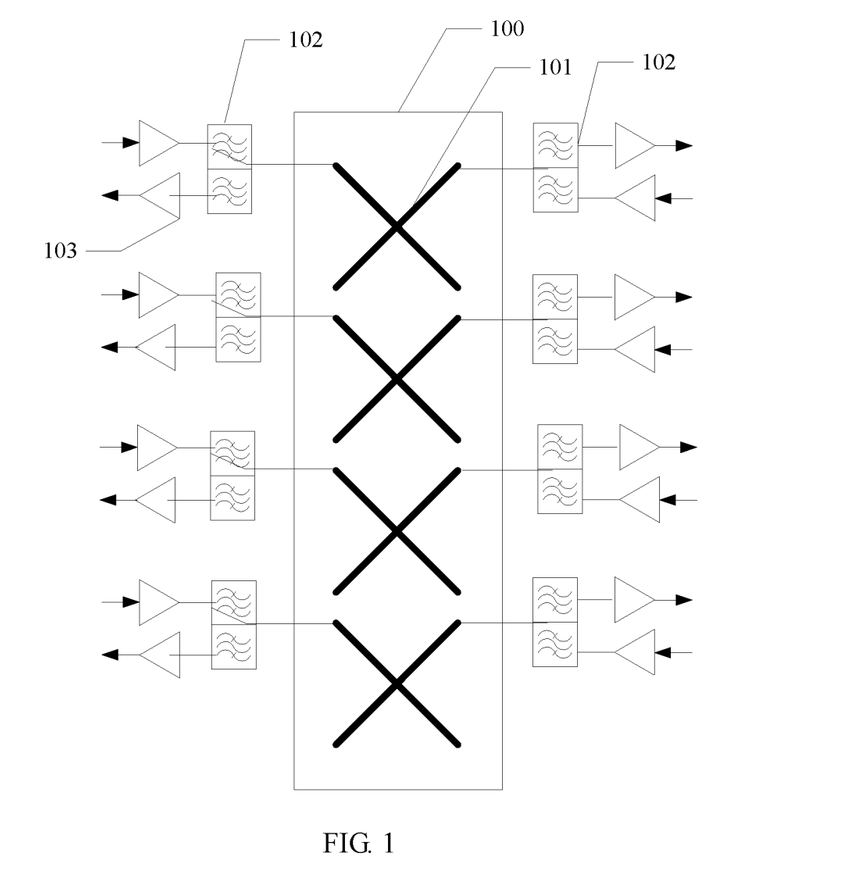
FIG. 1 is a schematic structural diagram of an antenna system provided in the prior art.

In an existing solution, as shown in FIG. 1, to satisfy the requirement for the multi-column antenna, an antenna array 100 includes a plurality of antenna units 101, and the antenna unit 101 is connected to both a receiver 103 and a transmitter 104 by using a duplexer 102.

If the existing solution is used, when a quantity of antennas units increases, a consumable, a size, a weight, costs, and the like of the antenna unit 101 greatly increase, and a yield rate decreases. In addition, isolation between the receiver 103 and the transmitter 104 is not enough, and consequently intermodulation occurs, and a radio frequency indicator decreases or cannot even be used.

SUMMARY

Embodiments of the present invention provide an antenna system in which an intermodulation indicator of the antenna system can be improved.

A first aspect of the embodiments of the present invention provides an antenna system.

The antenna system in this embodiment is configured in two manners:

Manner 1:

The antenna system is in a passive antenna architecture, and the antenna system includes an RRU (English full name: Radio Remote Unit). A transmitter and a receiver are disposed in the RRU, and the RRU is connected to an antenna array through a cable.

The antenna array in this embodiment includes a plurality of antenna units.

Specifically, the antenna system in this embodiment is usually applied in the following manners: In a manner, the RRU is disposed below a signal tower, the antenna array is disposed above the signal tower, and the RRU is connected to the antenna array through the cable. In another manner, the RRU is disposed above the tower, and the RRU is quite close to the antenna array. For example, the RRU is disposed below or behind the antenna array, and the RRU is connected to the antenna array through the cable.

Manner 2:

The antenna system is in an active antenna architecture, and in a structure of the antenna system, a transmitter, a receiver, and an antenna array are disposed in an integrated manner, that is, the transmitter, the receiver, and the antenna array are integrated together to constitute an active antenna.

In this embodiment, the antenna system includes a receiver set, a transmitter set, and an antenna array, where the receiver set includes a plurality of receivers, and the transmitter set includes a plurality of transmitters;

the antenna array includes a first antenna unit set and a second antenna unit set;

the first antenna unit set includes at least one first target antenna unit, the second antenna unit set includes at least one second target antenna unit, and any one of the at least one first target antenna unit and any one of the at least one second target antenna unit are different antenna units; and any one of the at least one first target antenna unit is connected to any receiver in the receiver set, and any one of the at least one second target antenna unit is connected to any transmitter in the transmitter set.

Specifically, the first target antenna unit is connected to any receiver in the receiver set, and different first target antenna units are connected to different receivers.

Specifically, the first target antenna unit in this embodiment is connected to the receiver by using a duplexer.

In this embodiment, the second target antenna unit is connected to any transmitter in the transmitter set, and different second target antenna units are connected to different transmitters.

Specifically, the second target antenna unit in this embodiment is connected to the transmitter by using a duplexer.

Beneficial effects of using the antenna system in this embodiment are as follows.

In the antenna system in this embodiment, the antenna array can be divided, so that the first antenna unit set and the second antenna unit set that are obtained through division are antenna units isolated from each other. To be specific, the first target antenna unit included in the first antenna unit set is connected only to the receiver, that is, there is no connection relationship between the first target antenna unit and the transmitter; and the second target antenna unit included in the second antenna unit set is connected only to the transmitter, that is, there is no connection relationship between the second target antenna unit and the receiver. In this way, in the antenna system in this embodiment, the receiver and the transmitter are completely isolated from each other, thereby increasing isolation between the receiver and the transmitter, and effectively improving an intermodulation indicator of the antenna system.

For the antenna system used in this embodiment, a relationship between a quantity of receivers and a quantity of transmitters is not limited, that is, the quantities of receivers and transmitters do not need to be the same, so that the antenna system in this embodiment can be applied to different application scenarios; and each antenna unit in the antenna system needs to be connected to only one receiver or transmitter, different from a case in the prior art in which one antenna unit needs to be connected to both a transmitter and a receiver. It can be learned that a structure of the antenna unit can be simplified in this embodiment, thereby effectively increasing a yield rate of manufacturing the antenna unit, reducing a consumable, a size, and a weight of the antenna, and facilitating installation and use by a user.

With reference to the first aspect of the embodiments of the present invention, in a first implementation of the first aspect of the embodiments of the present invention, a plurality of first target antenna units are adjacently arranged in the antenna array; and a plurality of second target antenna units are adjacently arranged in the antenna array.

For the antenna structure used in this embodiment, the plurality of first target antenna units are adjacently arranged in the antenna array, and the plurality of second target antenna units are adjacently arranged in the antenna array, so that the user connects the first target antenna unit to any receiver in the receiver set, where different first target antenna units are connected to different receivers, and connects the second target antenna unit to any transmitter in the transmitter set, where different second target antenna units are connected to different transmitters. This improves antenna installation efficiency. In addition, in the antenna system in this embodiment, the receiver and the transmitter are completely isolated from each other, thereby increasing the isolation between the receiver and the transmitter, and effectively improving the intermodulation indicator of the antenna system.

With reference to the first aspect of the embodiments of the present invention, in a second implementation of the first aspect of the embodiments of the present invention, if the first target antenna unit set includes a plurality of first target antenna units, at least one second target antenna unit is arranged between any two adjacent first target antenna units of the plurality of first target antenna units in the antenna array.

In this embodiment, one or more second target antenna units are arranged between any two adjacent first target antenna units. It should be noted that a quantity of second target antenna units arranged between two first target antenna units is not limited in this embodiment.

For the antenna system used in this embodiment, in the antenna array, the first target antenna unit and the second target antenna unit may be arranged adjacently. It should be noted that, in this embodiment, a description of locations of the first target antenna unit and the second target antenna unit in the antenna array is an optional example, and no limitation is imposed provided that: the first target antenna unit is connected only to the receiver, that is there is no connection relationship between the first target antenna unit and the transmitter; and the second target antenna unit is connected only to the transmitter, and there is no connection relationship between the second target antenna unit and the receiver.

For the antenna system used in this embodiment, the relationship between the quantity of receivers and the quantity of transmitters is not limited, that is, the quantities of receivers and transmitters do not need to be the same, so that the antenna system in this embodiment can be applied to different application scenarios; and each antenna unit in the antenna system needs to be connected to only one receiver or transmitter, different from the case in the prior art in which one antenna unit needs to be connected to both the transmitter and the receiver. It can be learned that the structure of the antenna unit can be simplified in this embodiment, thereby effectively increasing the yield rate of manufacturing the antenna unit, reducing the consumable, the size, and the weight of the antenna, and facilitating installation and use by the user.

With reference to the antenna system according to any one of the first aspect of the embodiments of the present invention to the second implementation of the first aspect of the embodiments of the present invention, in a third implementation of the first aspect of the embodiments of the present invention, the antenna system further includes at least two target device sets, and any one of the at least two target device sets includes a receiver and a transmitter;

specifically, the antenna array further includes a third antenna unit set, where the third antenna unit set includes at least one third target antenna unit, and any one of the at least one third target antenna unit includes a first antenna element and a second antenna element; and more specifically, the first antenna element is connected to both the receiver and the transmitter that are included in one of the at least two target device sets, and the second antenna element is connected to both the receiver and the transmitter that are included in another of the at least two target device sets.

For the antenna system used in this embodiment, it can be learned that the antenna array in this embodiment includes the first antenna unit set, the second antenna unit set, and the third antenna unit set; and the first target antenna unit included in the first antenna unit set is connected only to the receiver, the second target antenna unit included in the second antenna unit set is connected only to the transmitter, and the third target antenna unit included in the third antenna unit set provided in this embodiment is connected to both the receiver and the transmitter. It can be learned that, for the antenna system used in this embodiment, some of the transmitters and the receivers can be isolated from each other, that is, the receiver connected to the first antenna unit set and the transmitter connected to the second antenna unit set can be effectively isolated from each other, thereby increasing the isolation between the receiver and the transmitter, and effectively improving the intermodulation indicator of the antenna system.

For the antenna system used in this embodiment, the relationship between the quantity of receivers and the quantity of transmitters is not limited, that is, the quantities of receivers and transmitters do not need to be the same, so that the antenna system in this embodiment can be applied to different application scenarios. In addition, the structure of the antenna unit can be simplified in this embodiment, thereby effectively increasing the yield rate of manufacturing the antenna unit, reducing the consumable, the size, and the weight of the antenna, and facilitating installation and use by the user.

With reference to the third implementation of the first aspect of the embodiments of the present invention, in a fourth implementation of the first aspect of the embodiments of the present invention, the third antenna unit set is arranged between the first antenna unit set and the second antenna unit set in the antenna array.

For the antenna system used in this embodiment, some of the transmitters and the receivers can be isolated from each other, that is, the receiver connected to the first antenna unit set and the transmitter connected to the second antenna unit set can be effectively isolated from each other, thereby increasing the isolation between the receiver and the transmitter, and effectively improving the intermodulation indicator of the antenna system.

For the antenna system used in this embodiment, the relationship between the quantity of receivers and the quantity of transmitters is not limited, that is, the quantities of receivers and transmitters do not need to be the same, so that the antenna system in this embodiment can be applied to different application scenarios. In addition, the structure of the antenna unit can be simplified in this embodiment, thereby effectively increasing the yield rate of manufacturing the antenna unit, reducing the consumable, the size, and the weight of the antenna, and facilitating installation and use by the user.

With reference to the first aspect of the embodiments of the present invention, in a fifth implementation of the first aspect of the embodiments of the present invention, the antenna array further includes a fourth antenna unit set, the fourth antenna unit set includes at least one fourth target antenna unit, and any one of the at least one fourth target antenna unit includes a first antenna element and a second antenna element; and the first antenna element is connected to any receiver in the receiver set, and the second antenna element is connected to any transmitter in the transmitter set.

In this embodiment, the antenna unit can be further divided, so that the fourth target antenna unit includes the first antenna element and the second antenna element, and a device connected to the first antenna element is different from a device connected to the second antenna element, that is, the first antenna element is connected only to the receiver, and the second antenna element is connected only to the transmitter. In this arrangement, the receiver and the transmitter can be corresponding to different polarizations. It can be learned that, for the antenna system used in this embodiment, among the plurality of receivers connected to the first antenna elements and the plurality of transmitters connected to the second antenna elements, the receiver and the transmitter are corresponding to different polarizations of the fourth target antenna unit, so that the antenna system in this embodiment can be flexibly configured based on a polarization mode of the antenna unit. In this way, the isolation between the receiver and the transmitter is increased, and the intermodulation indicator of the antenna system can be significantly improved.

For the antenna system used in this embodiment, the relationship between the quantity of receivers and the quantity of transmitters is not limited, that is, the quantities of receivers and transmitters do not need to be the same, so that the antenna system in this embodiment can be applied to different application scenarios. In addition, the structure of the antenna unit can be simplified in this embodiment, thereby effectively increasing the yield rate of manufacturing the antenna unit, reducing the consumable, the size, and the weight of the antenna, and facilitating installation and use by the user.

With reference to the fifth implementation of the first aspect of the embodiments of the present invention, in a sixth implementation of the first aspect of the embodiments of the present invention, the first antenna element and the second antenna element are corresponding to different polarizations.

With reference to the antenna system according to the fifth implementation of the first aspect of the embodiments of the present invention or the sixth implementation of the first aspect of the embodiments of the present invention, in a seventh implementation of the first aspect of the embodiments of the present invention, the first antenna element is polarized at +45 degrees, and the second antenna element is polarized at −45 degrees.

For the antenna system used in this embodiment, the device connected to the first antenna element is different from the device connected to the second antenna element, that is, the first antenna element is connected only to the receiver, and the second antenna element is connected only to the transmitter. In this arrangement, the receiver and the transmitter can be corresponding to different polarizations. It can be learned that, for the antenna system used in this embodiment, among the plurality of receivers connected to the fourth target antenna units and the plurality of transmitters connected to the second antenna elements, the receiver and the transmitter are corresponding to different polarizations of the fourth target antenna unit, so that the antenna system in this embodiment can be flexibly configured based on the polarization mode of the antenna unit. In this way, the isolation between the receiver and the transmitter is increased, and the intermodulation indicator of the antenna system can be significantly improved. The relationship between the quantity of receivers and the quantity of transmitters is not limited, that is, the quantities of receivers and transmitters do not need to be the same, so that the antenna system in this embodiment can be applied to different application scenarios. In addition, the structure of the antenna unit can be simplified in this embodiment, thereby effectively increasing the yield rate of manufacturing the antenna unit, reducing the consumable, the size, and the weight of the antenna, and facilitating installation and use by the user.

With reference to the antenna system according to any one of the fifth implementation of the first aspect of the embodiments of the present invention to the seventh implementation of the first aspect of the embodiments of the present invention, in an eighth implementation of the first aspect of the embodiments of the present invention, if the fourth antenna unit set includes a plurality of fourth target antenna units, the plurality of fourth target antenna units are adjacently arranged in the antenna array.

For the antenna structure used in this embodiment, because the plurality of fourth target antenna units are adjacently arranged in the antenna array, antenna installation efficiency is improved. In addition, in the antenna system in this embodiment, the receiver and the transmitter are completely isolated from each other, thereby increasing the isolation between the receiver and the transmitter, and effectively improving the intermodulation indicator of the antenna system.

With reference to the antenna system according to any one of the fifth implementation of the first aspect of the embodiments of the present invention to the seventh implementation of the first aspect of the embodiments of the present invention, in a ninth implementation of the first aspect of the embodiments of the present invention, if the fourth antenna unit set includes a plurality of fourth target antenna units, at least one target antenna unit is arranged between any two adjacent fourth target antenna units of the plurality of fourth target antenna units in the antenna array, where the target antenna unit is the first target antenna unit and/or the second target antenna unit.

A second aspect of the embodiments of the present invention provides an antenna system, including a plurality of receivers, a plurality of transmitters, and an antenna array, where the antenna array includes at least one antenna unit, and any one of the at least one antenna unit includes a first antenna element and a second antenna element; and the first antenna element is connected to any one of the plurality of receivers, and the second antenna element is connected to any one of the plurality of transmitters.

In this embodiment, the antenna unit can be further divided, so that the antenna unit includes the first antenna element and the second antenna element, and a device connected to the first antenna element is different from a device connected to the second antenna element, that is, the first antenna element is connected only to the receiver, and the second antenna element is connected only to the transmitter. In this arrangement, the receiver and the transmitter can be corresponding to different polarizations. It can be learned that, for the antenna system used in this embodiment, among the plurality of receivers connected to the antenna units and the plurality of transmitters connected to the second antenna elements, the receiver and the transmitter are corresponding to different polarizations of the antenna unit, so that the antenna system in this embodiment can be flexibly configured based on a polarization mode of the antenna unit. In this way, isolation between the receiver and the transmitter is increased, and an intermodulation indicator of the antenna system can be significantly improved.

Moreover, for the antenna system used in this embodiment, a relationship between a quantity of receivers and a quantity of transmitters is not limited, that is, the quantities of receivers and transmitters do not need to be the same, so that the antenna system in this embodiment can be applied to different application scenarios. In addition, a structure of the antenna unit can be simplified in this embodiment, thereby effectively increasing a yield rate of manufacturing the antenna unit, reducing a consumable, a size, and a weight of the antenna, and facilitating installation and use by a user.

With reference to the second aspect of the embodiments of the present invention, in a first implementation of the second aspect of the embodiments of the present invention, the first antenna element and the second antenna element are corresponding to different polarizations.

For the antenna system used in this embodiment, the first antenna element and the second antenna element are corresponding to different polarizations, so that the antenna system in this embodiment can be flexibly configured based on the polarization mode of the antenna unit. In this way, the isolation between the receiver and the transmitter is increased, and the intermodulation indicator of the antenna system can be significantly improved.

With reference to the second aspect of the embodiments of the present invention or the first implementation of the second aspect of the embodiments of the present invention, in a second implementation of the second aspect of the embodiments of the present invention, the first antenna element is polarized at +45 degrees, and the second antenna element is polarized at −45 degrees.

For the antenna system used in this embodiment, the relationship between the quantity of receivers and the quantity of transmitters is not limited, that is, the quantities of receivers and transmitters do not need to be the same, so that the antenna system in this embodiment can be applied to different application scenarios.

It can be learned from the foregoing technical solutions that, for the antenna system used in the embodiments, the relationship between the quantity of receivers and the quantity of transmitters is not limited, that is, the quantities of receivers and transmitters do not need to be the same, so that the antenna system in the embodiments can be applied to different application scenarios; and each antenna unit in the antenna system needs to be connected to only one receiver or transmitter, different from the case in the prior art in which one antenna unit needs to be connected to both the transmitter and the receiver. It can be learned that the structure of the antenna unit can be simplified in the embodiments, thereby effectively increasing the yield rate of manufacturing the antenna unit, reducing the consumable, the size, and the weight of the antenna, and facilitating installation and use by the user.

DESCRIPTION OF EMBODIMENTS

The present invention provides an antenna system in which isolation between a receiver and a transmitter can be effectively increased. The following first describes in detail a structure of the antenna system provided in the embodiments from a perspective of a physical device.

The antenna system in the embodiments may have two structures.

Figure 2:
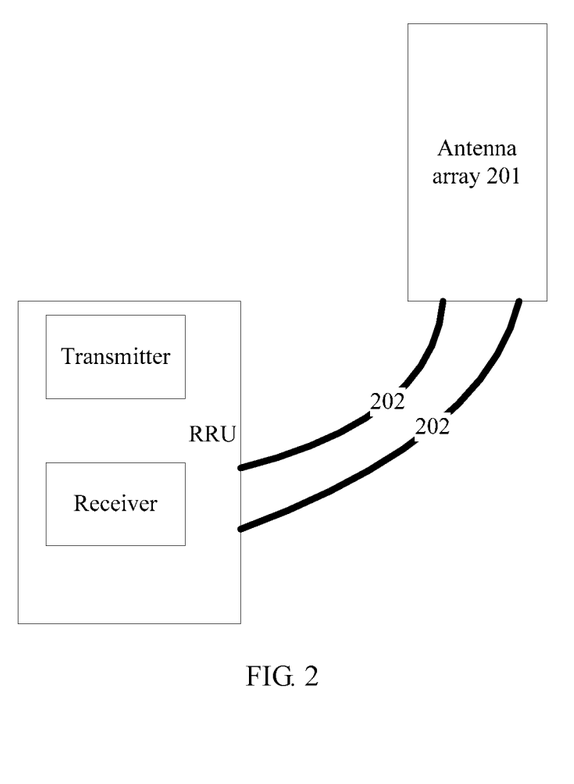
FIG. 2 is a schematic structural diagram of an antenna system according to an embodiment of the present invention.

One structure of the antenna system is shown in FIG. 2. FIG. 2 is a schematic structural diagram of an antenna system according to an embodiment of the present invention.

The antenna system shown in FIG. 2 is in a passive antenna architecture, and the antenna system includes an RRU (English full name: Radio Remote Unit) 200. A transmitter and a receiver are disposed in the RRU 200, and the RRU 200 is connected to an antenna array 201 through a cable 202.

The antenna array 201 in this embodiment includes a plurality of antenna units.

Specifically, the antenna system shown in FIG. 2 is usually applied in the following manners: In a manner, the RRU 200 is disposed below a signal tower, the antenna array 201 is disposed above the signal tower, and the RRU 200 is connected to the antenna array 201 through the cable 202. In another manner, the RRU 200 is disposed above the tower, and the RRU 200 is quite close to the antenna array 201. For example, the RRU 200 is disposed below or behind the antenna array 201, and the RRU 200 is connected to the antenna array 201 through the cable 202.

Figure 3:
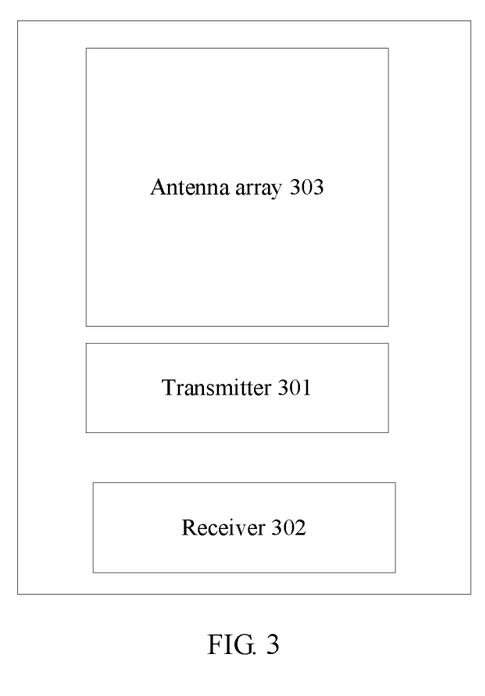
FIG. 3 is a schematic structural diagram of an antenna system according to an embodiment of the present invention.

For another manner of configuring a structure of the antenna system, refer to FIG. 3. FIG. 3 is a schematic structural diagram of an antenna system according to an embodiment of the present invention.

The antenna system shown in FIG. 3 is in an active antenna architecture. In a structure shown in FIG. 3, a transmitter 301, a receiver 302, and an antenna array 303 are disposed in an integrated manner, that is, the transmitter 301, the receiver 302, and the antenna array 303 are integrated together to constitute an active antenna.

Figure 4:
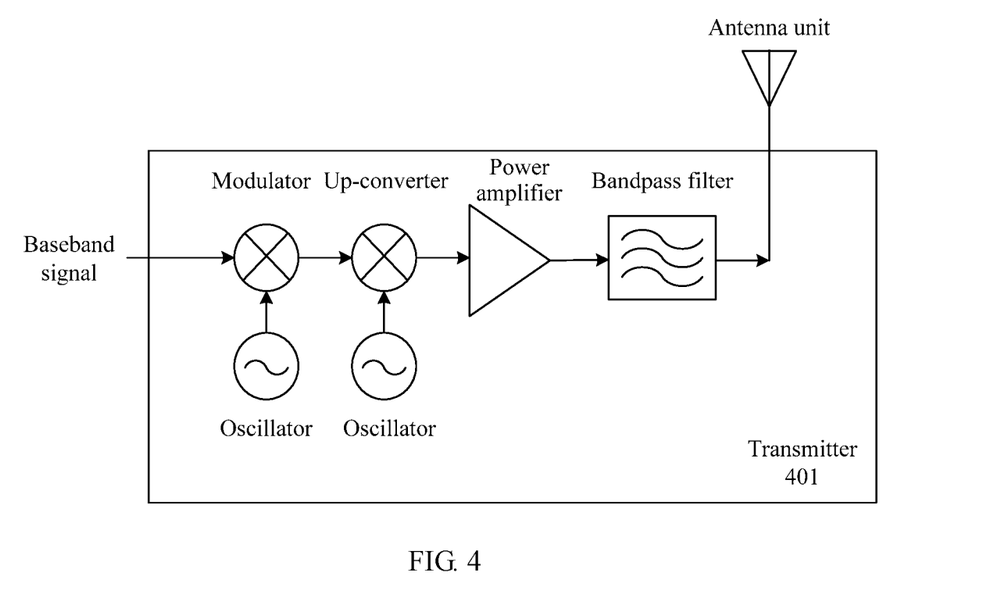
FIG. 4 is a schematic structural diagram of a transmitter according to an embodiment of the present invention.

The following describes a specific structure of a transmitter from a perspective of a physical device with reference to FIG. 4. FIG. 4 is a schematic structural diagram of a transmitter according to an embodiment of the present invention.

It should be noted that a description of the specific structure of the transmitter in this embodiment is an optional example. No limitation is imposed.

The transmitter 401 in this embodiment is configured to transmit uplink data. Specifically, a modulator included in the transmitter 401 modulates a baseband signal onto a carrier, shifts a modulated bandpass signal to a required operating frequency band by using an up-converter, amplifies a shifted bandpass signal by using a power amplifier, filters an amplified signal, and then sends a filtered signal.

Figure 5:
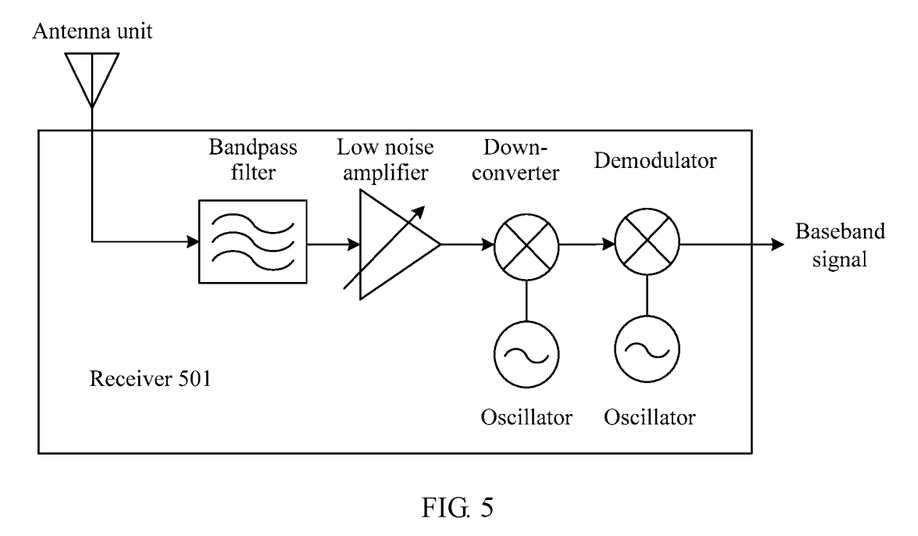
FIG. 5 is a schematic structural diagram of a receiver according to an embodiment of the present invention.

The following describes a specific structure of a receiver from a perspective of a physical device with reference to FIG. 5. FIG. 5 is a schematic structural diagram of a receiver according to an embodiment of the present invention.

It should be noted that a description of the specific structure of the receiver in this embodiment is an optional example. No limitation is imposed.

In the receiver 501 in this embodiment, an RF portion of the receiver 501 is opposite to that of a transmitter: A bandpass filter selects a wanted signal from a plurality of radio wave signals; a low noise amplifier (LNA) amplifies the selected wanted signal; a down-converter converts the RF signal into an IF signal; and a demodulator performs demodulation to convert the frequency band signal into a baseband signal.

Based on the foregoing description of the physical structure of the antenna system and with reference to the accompanying drawings, the following describes a specific structure of the antenna system, provided in the embodiments, in which isolation between the receiver and the transmitter can be increased and an intermodulation indicator of an antenna array can be improved.

Figure 6:
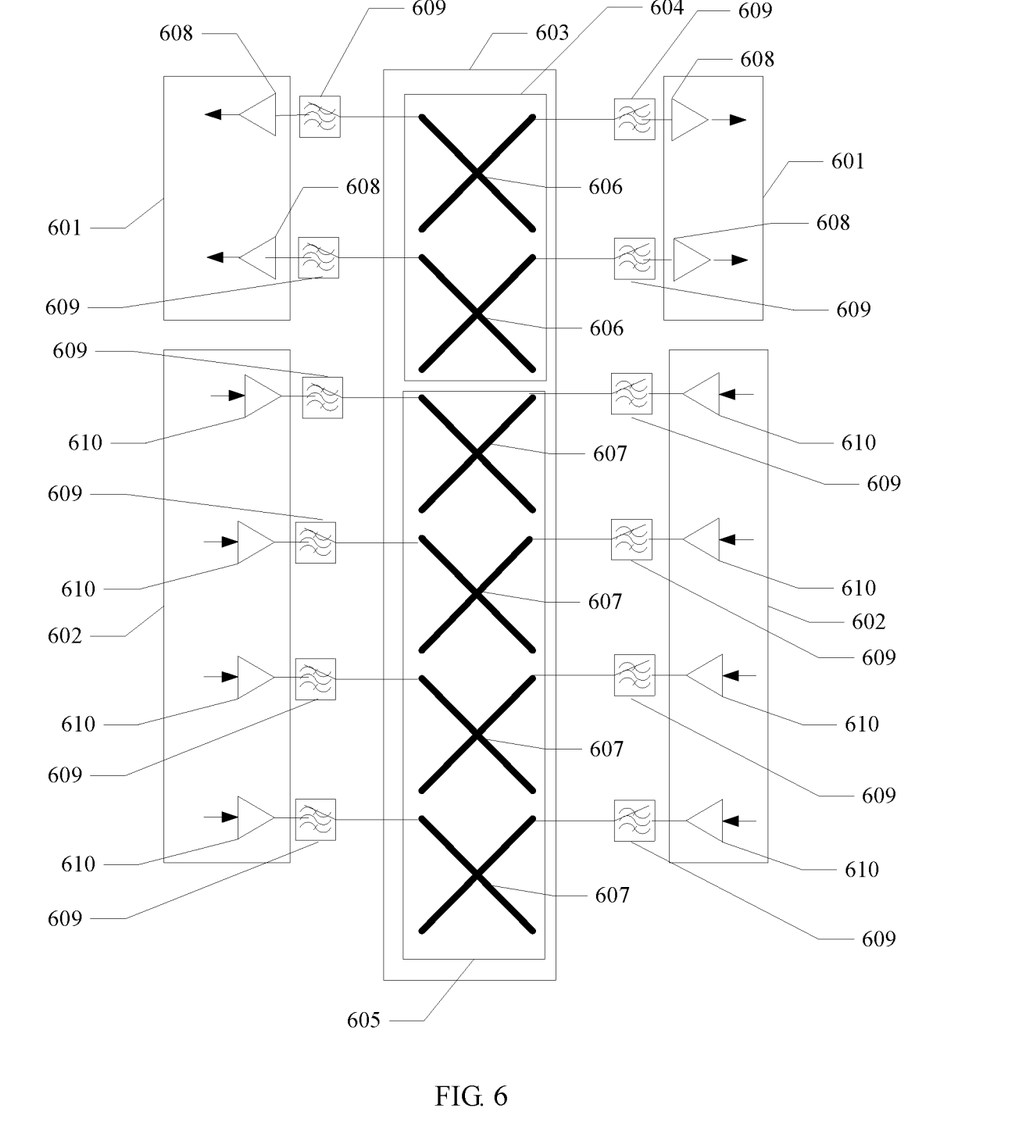
FIG. 6 is a schematic structural diagram of an antenna system according to an embodiment of the present invention.

FIG. 6 is a schematic structural diagram of an antenna system according to an embodiment of the present invention.

The antenna system in this embodiment includes a receiver set 601, and the receiver set 601 includes a plurality of receivers. A quantity of receivers included in the receiver set 601 is not limited in this embodiment. For a description of a specific structure of the receiver, refer to the foregoing embodiment. Details are not repeated in this embodiment.

The antenna system further includes a transmitter set 602, and the transmitter set 602 includes a plurality of transmitters. A quantity of transmitters included in the transmitter set 602 is not limited in this embodiment. For a description of a specific structure of the transmitter, refer to the foregoing embodiment. Details are not repeated in this embodiment.

The antenna system further includes an antenna array 603.

Specifically, the antenna array 603 in this embodiment includes a first antenna unit set 604 and a second antenna unit set 605.

More specifically, the first antenna unit set 604 includes at least one first target antenna unit 606, and the second antenna unit set 605 includes at least one second target antenna unit 607.

A specific quantity of first target antenna units 606 included in the first antenna unit set 604 is not limited in this embodiment. As shown in FIG. 6, an example in which there are two first target antenna units 606 is used for description in this embodiment.

In this embodiment, as shown in FIG. 6, the plurality of first target antenna units 606 are adjacently arranged in the antenna array 603.

A specific quantity of second target antenna units 607 included in the second antenna unit set 605 is not limited in this embodiment. As shown in FIG. 6, an example in which there are four second target antenna units 607 is used for description in this embodiment.

In this embodiment, as shown in FIG. 6, the plurality of second target antenna units 607 are adjacently arranged in the antenna array 603.

The first target antenna unit 606 and the second target antenna unit 607 are different antenna units.

In this embodiment, the first target antenna unit 606 is connected to any receiver 608 in the transmitter set 602, and different first target antenna units 606 are connected to different receivers 608.

Specifically, the first target antenna unit 606 in this embodiment is connected to the receiver 608 by using a duplexer 609.

In this embodiment, the second target antenna unit 607 is connected to any transmitter 610 in the transmitter set 602, and different second target antenna units 607 are connected to different transmitters 610.

Specifically, the second target antenna unit 607 in this embodiment is connected to the transmitter 610 by using a duplexer 609.

More specifically, each antenna unit in this embodiment includes two antenna elements: a first antenna element and a second antenna element. As shown in the figure, an example in which the first antenna element is perpendicular to the second antenna element is used for description in this embodiment, but no limitation is imposed. In specific application, a single polarization antenna or a structure including an element in another form may alternatively be used.

Beneficial effects of using the antenna system in this embodiment are as follows.

In the antenna system in this embodiment, the antenna array can be divided, so that the first antenna unit set and the second antenna unit set that are obtained through division are antenna units isolated from each other. To be specific, the first target antenna unit included in the first antenna unit set is connected only to the receiver, that is, there is no connection relationship between the first target antenna unit and the transmitter; and the second target antenna unit included in the second antenna unit set is connected only to the transmitter, that is, there is no connection relationship between the second target antenna unit and the receiver. In this way, in the antenna system in this embodiment, the receiver and the transmitter are completely isolated from each other, thereby increasing isolation between the receiver and the transmitter, and effectively improving an intermodulation indicator of the antenna system.

For the antenna system used in this embodiment, a relationship between the quantity of receivers and the quantity of transmitters is not limited, that is, the quantities of receivers and transmitters do not need to be the same, so that the antenna system in this embodiment can be applied to different application scenarios; and each antenna unit in the antenna system needs to be connected to only one receiver or transmitter, different from a case in the prior art in which one antenna unit needs to be connected to both a transmitter and a receiver. It can be learned that a structure of the antenna unit can be simplified in this embodiment, thereby effectively increasing a yield rate of manufacturing the antenna unit, reducing a consumable, a size, and a weight of the antenna, and facilitating installation and use by a user.

Figure 7:
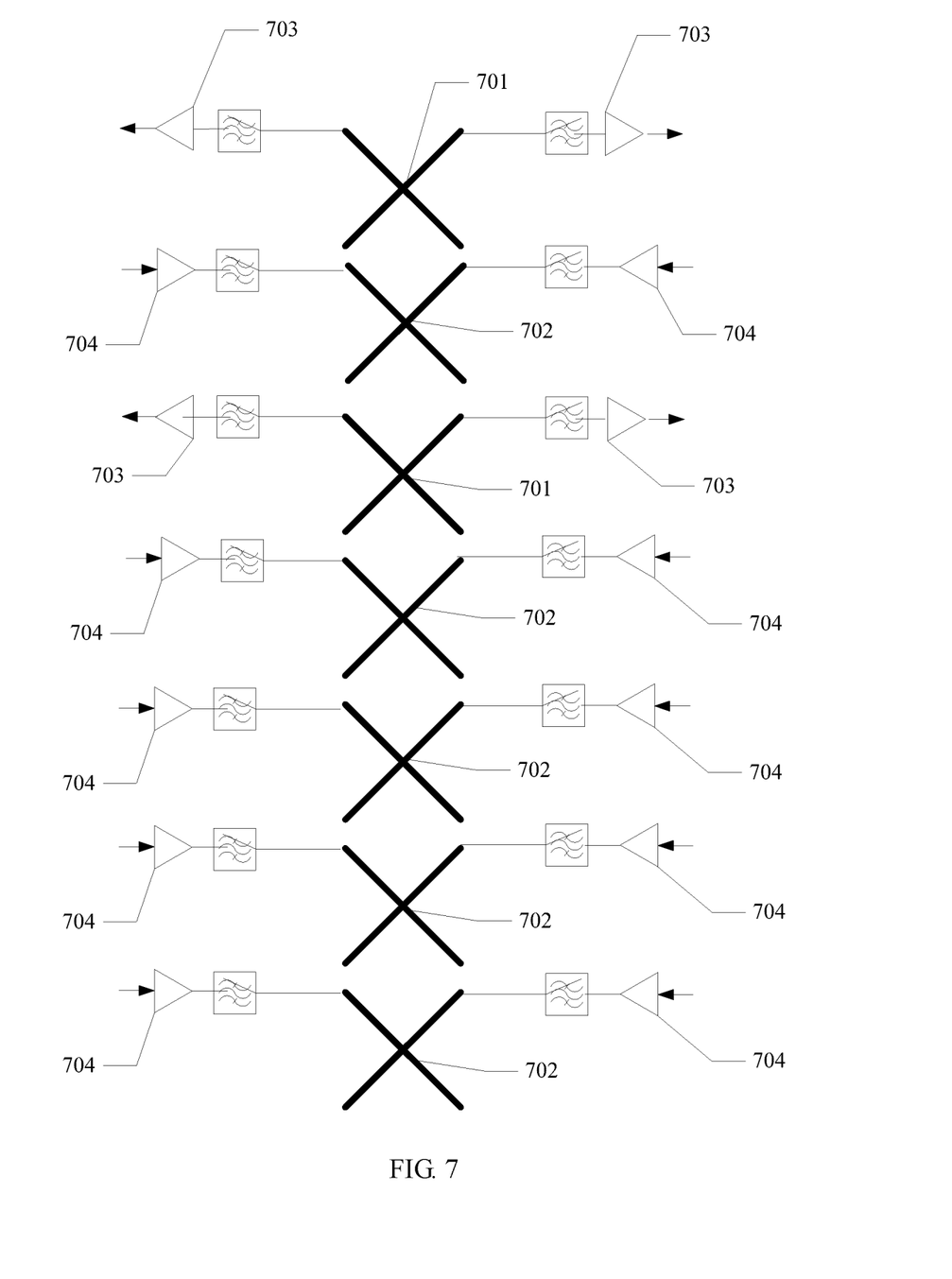
FIG. 7 is a schematic structural diagram of an antenna system according to another embodiment of the present invention.

For another structure of the antenna system in the embodiments, refer to FIG. 7. FIG. 7 is a schematic structural diagram of an antenna system according to another embodiment of the present invention.

In the embodiment shown in FIG. 7, for a specific description of a receiver set and a transmitter set, refer to the foregoing embodiment. Details are not repeated in this embodiment.

For a specific description of a first target antenna unit 701 in this embodiment and a connection relationship of the first target antenna unit 701, refer to the specific description of the first target antenna unit 606 in the embodiment shown in FIG. 6. Details are not repeated in this embodiment. For a specific description of a second target antenna unit 702 in this embodiment and a connection relationship of the second target antenna unit 702, refer to the specific description of the second target antenna unit 607 in the embodiment shown in FIG. 6. Details are not repeated in this embodiment.

An example in which there are two first target antenna units 701 and five second target antenna units 702 is used for description in this embodiment. It should be noted that a description of quantities of first target antenna units 701 and second target antenna units 702 in this embodiment is an optional example. No limitation is imposed.

Specifically, in this embodiment, for example, if the first target antenna unit set includes a plurality of first target antenna units 701, at least one second target antenna unit 702 is arranged between any two adjacent first target antenna units of the plurality of first target antenna units 701 in an antenna array.

In this embodiment, one or more second target antenna units 702 are arranged between any two adjacent first target antenna units 701. For example, as shown in FIG. 7, one second target antenna unit 702 is arranged between two first target antenna units 701. It should be noted that a quantity of second target antenna units 702 arranged between two first target antenna units 701 is not limited in this embodiment.

For the antenna system used in this embodiment, in the antenna array, the first target antenna unit 701 and the second target antenna unit 702 may be arranged adjacently. It should be noted that, in this embodiment, a description of locations of the first target antenna unit 701 and the second target antenna unit 702 in the antenna array is an optional example, and no limitation is imposed provided that: the first target antenna unit 701 is connected only to the receiver 703, and there is no connection relationship between the first target antenna unit 701 and the transmitter 704; and the second target antenna unit 702 is connected only to the transmitter 704, and there is no connection relationship between the second target antenna unit 702 and the receiver 703.

For beneficial effects brought by the antenna system shown in FIG. 7, refer to the embodiment shown in FIG. 6. Details are not repeated in this embodiment.

Figure 8:
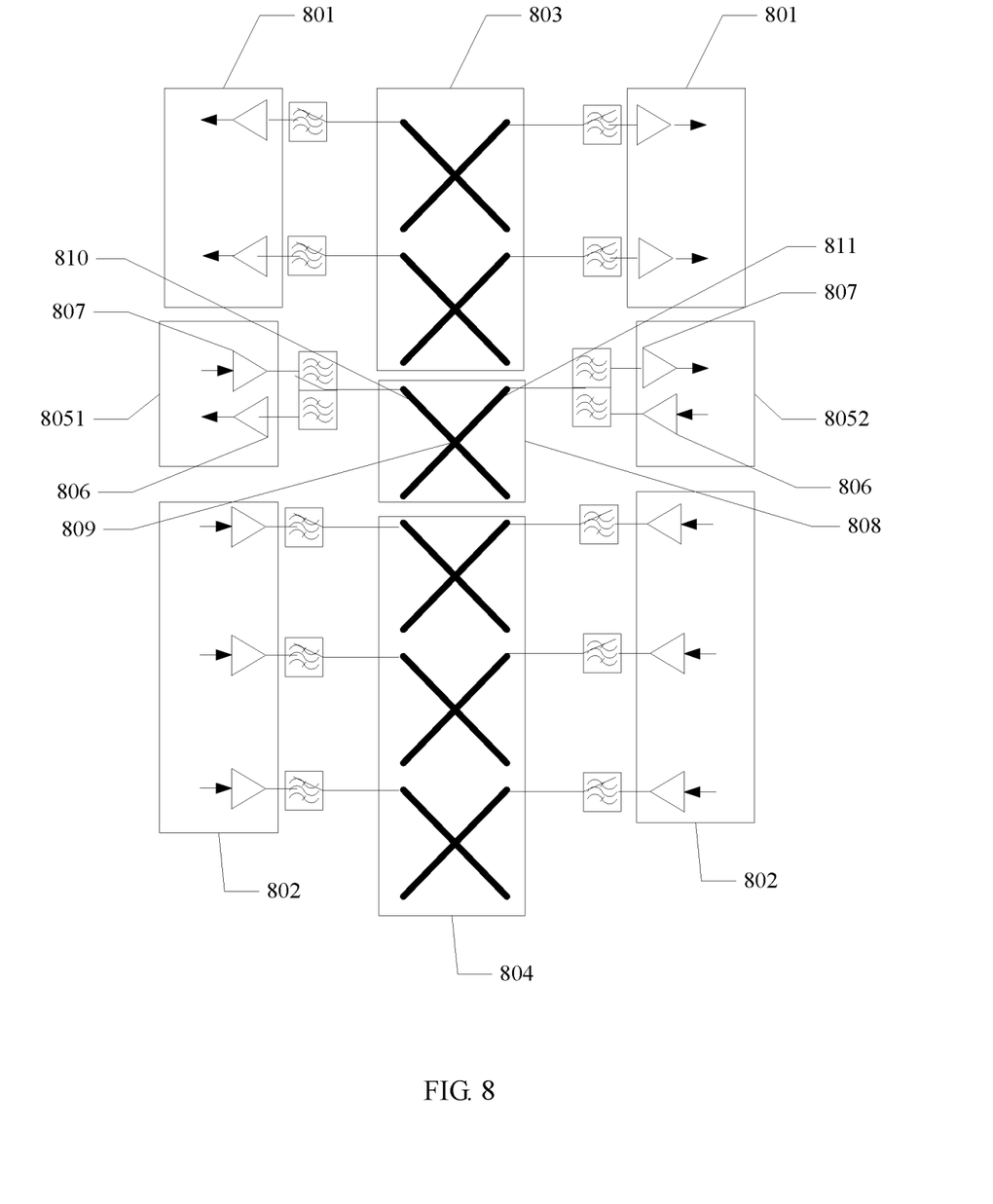
FIG. 8 is a schematic structural diagram of an antenna system according to another embodiment of the present invention.

For another structure of the antenna system in the embodiments, refer to FIG. 8. FIG. 8 is a schematic structural diagram of an antenna system according to another embodiment of the present invention.

In the embodiment shown in FIG. 8, for a specific description of a receiver set 801, refer to the specific description of the receiver set 601 shown in FIG. 6. Details are not repeated in this embodiment.

For a specific description of a transmitter set 802 in this embodiment, refer to the specific description of the transmitter set 602 shown in FIG. 6. Details are not repeated in this embodiment.

For a specific description of a first antenna unit set 803 in this embodiment, refer to the specific description of the first antenna unit set 604 shown in FIG. 6. Details are not repeated in this embodiment.

For a specific description of a second antenna unit set 804 in this embodiment, refer to the specific description of the second antenna unit set 605 shown in FIG. 6. Details are not repeated in this embodiment.

Compared with the antenna system shown in FIG. 6, the antenna system in this embodiment further includes at least two target device sets. A specific quantity of target device sets is not limited in this embodiment. As shown in FIG. 8, an example in which there are two target device sets is used for description. To be specific, the antenna system in this embodiment includes a target device set 8051 and a target device set 8052.

The target device set 8051 and the target device set 8052 in this embodiment are in a same structure. The target device set 8051 is used as an example. The target device set 8051 includes a receiver 806 and a transmitter 807. For a description of specific structures of the receiver 806 and the transmitter 807, refer to the foregoing embodiment. Details are not repeated in this embodiment.

An antenna array in this embodiment further includes a third antenna unit set 808.

The third antenna unit set 808 in this embodiment includes at least one third target antenna unit 809. Specifically, a specific quantity of third target antenna units 809 included in the third antenna unit set 808 is not limited in this embodiment. As shown in FIG. 8, an example in which the third antenna unit set 808 in this embodiment includes one third target antenna unit 809 is used for description.

Specifically, the third target antenna unit 809 in this embodiment includes a first antenna element 810 and a second antenna element 811.

More specifically, the first antenna element 810 is connected to both the receiver 806 and the transmitter 807 that are included in the target device set 8051; and the second antenna element 811 is connected to both the receiver 806 and the transmitter 807 that are included in the target device set 8052.

A specific location of the third antenna unit set 808 is not limited in this embodiment. Optionally, the third antenna unit set 808 in this embodiment is arranged between the first antenna unit set 803 and the second antenna unit set 804 in the antenna array.

For the antenna system used in this embodiment, it can be learned that the antenna array in this embodiment includes the first antenna unit set, the second antenna unit set, and the third antenna unit set; the first target antenna unit included in the first antenna unit set is connected only to the receiver, and the second target antenna unit included in the second antenna unit set is connected only to the transmitter; and the third target antenna unit included in the third antenna unit set provided in this embodiment is connected to both the receiver and the transmitter, and the third antenna unit set is arranged between the first antenna unit set and the second antenna unit set. It can be learned that, for the antenna system used in this embodiment, some of the transmitters and the receivers can be isolated from each other, that is, the receiver connected to the first antenna unit set and the transmitter connected to the second antenna unit set can be effectively isolated from each other, thereby increasing isolation between the receiver and the transmitter, and effectively improving an intermodulation indicator of the antenna system.

For the antenna system used in this embodiment, a relationship between a quantity of receivers and a quantity of transmitters is not limited, that is, the quantities of receivers and transmitters do not need to be the same, so that the antenna system in this embodiment can be applied to different application scenarios. In addition, a structure of the antenna unit can be simplified in this embodiment, thereby effectively increasing a yield rate of manufacturing the antenna unit, reducing a consumable, a size, and a weight of the antenna, and facilitating installation and use by a user.

Figure 9:
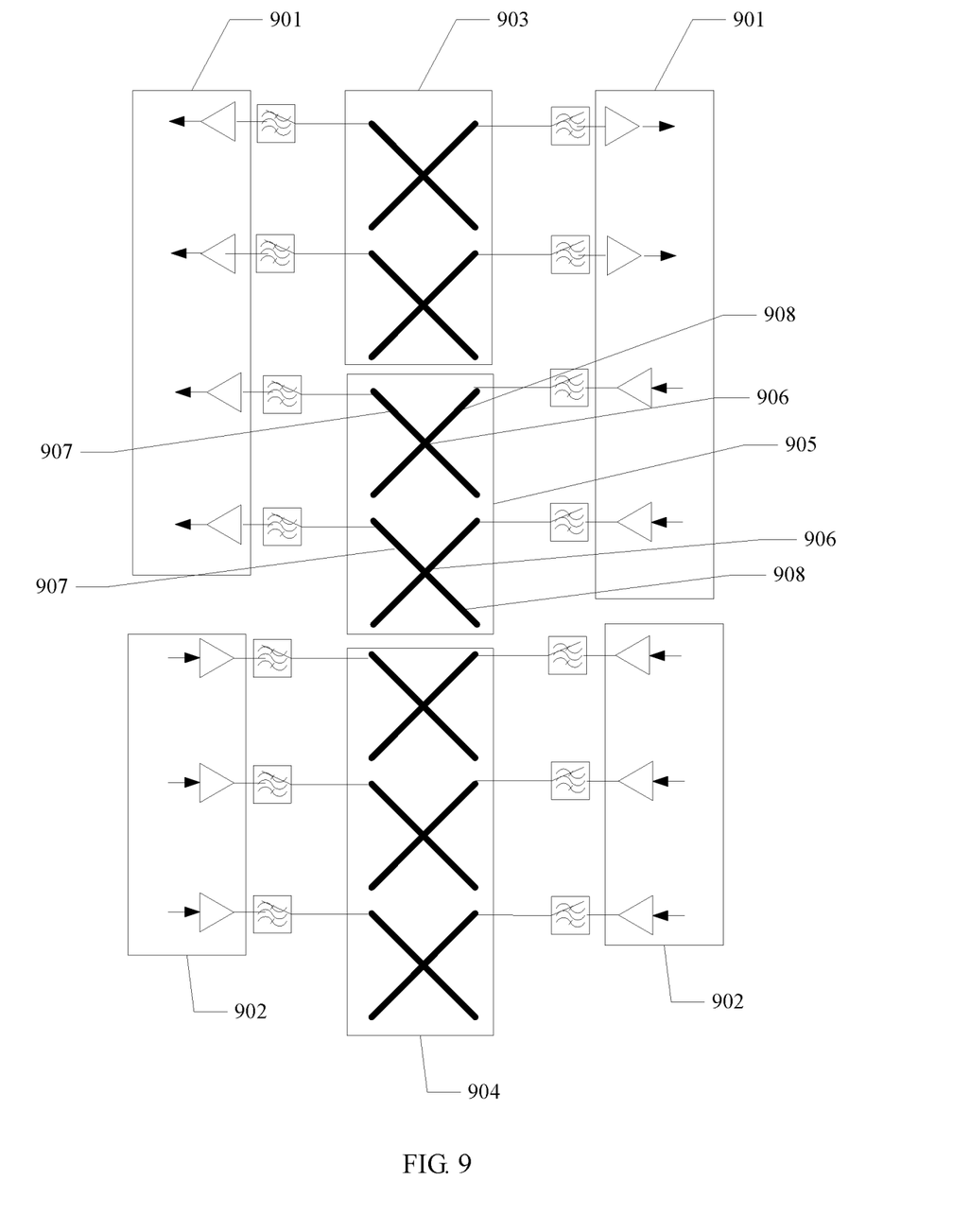
FIG. 9 is a schematic structural diagram of an antenna system according to another embodiment of the present invention.

For another structure of the antenna system in the embodiments, refer to FIG. 9. FIG. 9 is a schematic structural diagram of an antenna system according to another embodiment of the present invention.

In the embodiment shown in FIG. 9, for a specific description of a receiver set 901, refer to the specific description of the receiver set 601 shown in FIG. 6. Details are not repeated in this embodiment.

For a specific description of a transmitter set 902 in this embodiment, refer to the specific description of the transmitter set 602 shown in FIG. 6. Details are not repeated in this embodiment.

For a specific description of a first antenna unit set 903 in this embodiment, refer to the specific description of the first antenna unit set 604 shown in FIG. 6. Details are not repeated in this embodiment.

For a specific description of a second antenna unit set 904 in this embodiment, refer to the specific description of the second antenna unit set 605 shown in FIG. 6. Details are not repeated in this embodiment.

As shown in FIG. 9, an antenna array in this embodiment further includes a fourth antenna unit set 905, and the fourth antenna unit set 905 includes at least one fourth target antenna unit.

It should be noted that a specific quantity of fourth target antenna units included in the fourth antenna unit set 905 is not limited in this embodiment. As shown in FIG. 9, an example in which the fourth antenna unit set 905 in this embodiment includes two fourth target antenna units 906 is used for description.

Specifically, each fourth target antenna unit 906 in this embodiment includes a first antenna element 907 and a second antenna element 908.

More specifically, the first antenna element 907 is connected to one receiver in the receiver set 901, and different first antenna elements 907 are connected to different receivers in the receiver set 901; and the second antenna element 908 is connected to one transmitter in the transmitter set 902, and different second antenna elements 908 are connected to different transmitters in the transmitter set 902.

It should be noted that the first antenna element 907 and the second antenna element 908 in this embodiment are corresponding to different polarizations.

The polarizations corresponding to the first antenna element 907 and the second antenna element 908 are not limited in this embodiment, provided that the first antenna element 907 and the second antenna element 908 are corresponding to different polarizations. An example in which the first antenna element 907 is polarized at +45 degrees and the second antenna element 908 is polarized at −45 degrees is used for description in this embodiment.

Optionally, in this embodiment, for example, if the fourth antenna unit set 905 includes a plurality of fourth target antenna units 906, as shown in FIG. 9, the plurality of fourth target antenna units 906 are arranged adjacently in the antenna array.

Further optionally, in another embodiment, at least one target antenna unit is arranged between any two adjacent fourth target antenna units 906 of the plurality of fourth target antenna units 906 in the antenna array, where the target antenna unit is a first target antenna unit and/or a second target antenna unit.

For beneficial effects brought by the first target antenna unit and the second target antenna unit in this embodiment, refer to the foregoing embodiment. Details are not repeated in this embodiment. The following describes beneficial effects brought by the fourth target antenna unit 906 in this embodiment:

In this embodiment, the antenna unit can be further divided, so that the fourth target antenna unit 906 includes the first antenna element 907 and the second antenna element 908, and a device connected to the first antenna element 907 is different from a device connected to the second antenna element 908, that is, the first antenna element 907 is connected only to the receiver, and the second antenna element 908 is connected only to the transmitter. In this arrangement, the receiver and the transmitter can be corresponding to different polarizations. It can be learned that, for the antenna system used in this embodiment, among a plurality of receivers connected to the first antenna element 907 and a plurality of transmitters connected to the second antenna element 908, the receiver and the transmitter are corresponding to different polarizations of the fourth target antenna unit 906, so that the antenna system in this embodiment can be flexibly configured based on a polarization mode of the antenna unit. In this way, isolation between the receiver and the transmitter is increased, and an intermodulation indicator of the antenna system can be significantly improved.

For the antenna system used in this embodiment, a relationship between a quantity of receivers and a quantity of transmitters is not limited, that is, the quantities of receivers and transmitters do not need to be the same, so that the antenna system in this embodiment can be applied to different application scenarios. In addition, a structure of the antenna unit can be simplified in this embodiment, thereby effectively increasing a yield rate of manufacturing the antenna unit, reducing a consumable, a size, and a weight of the antenna, and facilitating installation and use by a user.

Figure 10:
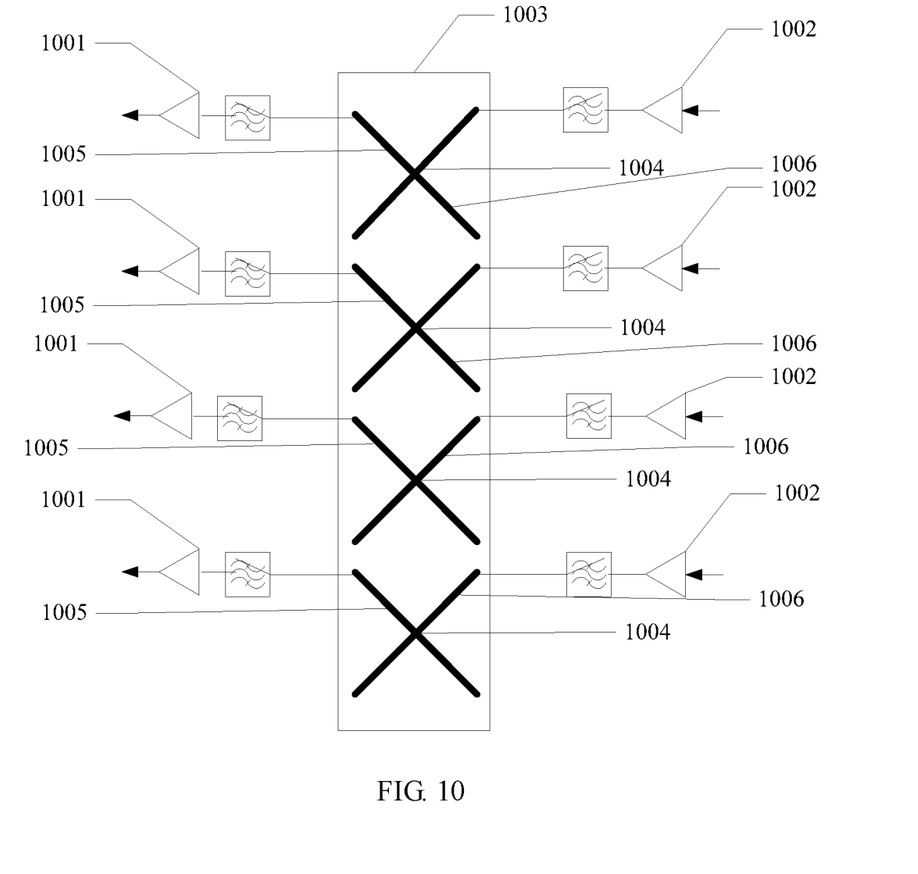
FIG. 10 is a schematic structural diagram of an antenna system according to another embodiment of the present invention.

For another structure of the antenna system in the embodiments, refer to FIG. 10. FIG. 10 is a schematic structural diagram of an antenna system according to another embodiment of the present invention.

As shown in FIG. 10, the antenna system in this embodiment includes a plurality of receivers 1001, a plurality of transmitters 1002, and an antenna array 1003.

The antenna array 1003 in this embodiment includes at least one antenna unit 1004.

A specific quantity of antenna units 1004 included in the antenna array 1003 is not limited in this embodiment. As shown in FIG. 10, an example in which the antenna array 1003 includes four antenna units 1004 is used for description in this embodiment.

The antenna unit 1004 includes a first antenna element 1005 and a second antenna element 1006.

Specifically, the first antenna element 1005 is connected to the receiver 1001, and different first antenna elements 1005 are connected to different receivers 1001; and the second antenna element 1006 is connected to the transmitter 1002, and different second antenna elements 1006 are connected to different transmitters 1002.

It should be noted that the first antenna element 1005 and the second antenna element 1006 in this embodiment are corresponding to different polarizations.

The polarizations corresponding to the first antenna element 1005 and the second antenna element 1006 are not limited in this embodiment, provided that the first antenna element 1005 and the second antenna element 1006 are corresponding to different polarizations. An example in which the first antenna element 1005 is polarized at +45 degrees and the second antenna element 1006 is polarized at −45 degrees is used for description in this embodiment.

In this embodiment, the antenna unit can be further divided, so that the antenna unit includes the first antenna element and the second antenna element, and a device connected to the first antenna element is different from a device connected to the second antenna element, that is, the first antenna element is connected only to the receiver, and the second antenna element is connected only to the transmitter. In this arrangement, the receiver and the transmitter can be corresponding to different polarizations. It can be learned that, for the antenna system used in this embodiment, among the plurality of receivers connected to the antenna units and the plurality of transmitters connected to the second antenna elements, the receiver and the transmitter are corresponding to different polarizations of the antenna unit, so that the antenna system in this embodiment can be flexibly configured based on a polarization mode of the antenna unit. In this way, isolation between the receiver and the transmitter is increased, and an intermodulation indicator of the antenna system can be significantly improved.

Moreover, for the antenna system used in this embodiment, a relationship between a quantity of receivers and a quantity of transmitters is not limited, that is, the quantities of receivers and transmitters do not need to be the same, so that the antenna system in this embodiment can be applied to different application scenarios. In addition, a structure of the antenna unit can be simplified in this embodiment, thereby effectively increasing a yield rate of manufacturing the antenna unit, reducing a consumable, a size, and a weight of the antenna, and facilitating installation and use by a user.

The foregoing embodiments are merely intended to describe the technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

The invention claimed is:

1. An antenna system, comprising a receiver set, a transmitter set, and an antenna array, wherein the receiver set comprises a plurality of receivers, and the transmitter set comprises a plurality of transmitters; and the antenna array comprises a first antenna unit set and a second antenna unit set; the first antenna unit set comprises at least one first target antenna unit, the second antenna unit set comprises at least one second target antenna unit, and any one of the at least one first target antenna unit and any one of the at least one second target antenna unit are different antenna units; and any one of the at least one first target antenna unit is connected to any receiver in the receiver set, and any one of the at least one second target antenna unit is connected to any transmitter in the transmitter set;

wherein the antenna array further comprises a fourth antenna unit set, the fourth antenna unit set comprises at least one fourth target antenna unit, and any one of the at least one fourth target antenna unit comprises a first antenna element and a second antenna element; and the first antenna element is connected to any receiver in the receiver set, and the second antenna element is connected to any transmitter in the transmitter set;

wherein when the first antenna unit set comprises a plurality of fourth target antenna units, at least one target antenna unit is arranged between any two adjacent fourth target antenna units of the plurality of fourth target antenna units in the antenna array, and the target antenna unit is the first target antenna unit and/or the second target antenna unit.

2. The antenna system according to claim 1, wherein when the first target antenna unit set comprises a plurality of first target antenna units; the plurality of first target antenna units are adjacently arranged in the antenna array; and if the second target antenna unit set comprises a plurality of second target antenna units, the plurality of second target antenna units are adjacently arranged in the antenna array.

3. The antenna system according to claim 1, wherein when the first target antenna unit set comprises a plurality of first target antenna units, at least one second target antenna unit is arranged between any two adjacent first target antenna units of the plurality of first target antenna units in the antenna array.

4. The antenna system according to claim 1, wherein the antenna system further comprises at least two target device sets, and any one of the at least two target device sets comprises a receiver and a transmitter;

the antenna array further comprises a third antenna unit set, wherein the third antenna unit set comprises at least one third target antenna unit, and any one of the at least one third target antenna unit comprises a first antenna element and a second antenna element; and the first antenna element is connected to both a receiver and a transmitter that are comprised in one of the at least two target device sets, and the second antenna element is connected to both a receiver and a transmitter that are comprised in another of the at least two target device sets.

5. The antenna system according to claim 4, wherein the third antenna unit set is disposed between the first antenna unit set and the second antenna unit set in the antenna array.

6. The antenna system according to claim 1, wherein the first antenna element and the second antenna element are corresponding to different polarizations.

7. The antenna system according to claim 1, wherein the first antenna element is polarized at +45 degrees, and the second antenna element is polarized at −45 degrees.

8. The antenna system according to claim 1, wherein when the fourth antenna unit set comprises a plurality of fourth target antenna units, the plurality of fourth target antenna units are adjacently arranged in the antenna array.

* * * * *